United States Patent [19]

Holt

[11] 4,447,767

[45] May 8, 1984

[54] SCR MOTOR SPEED CONTROL

[75] Inventor: Luther D. Holt, Mahonoy, Pa.

[73] Assignee: John J. Barni, Lake Harmony, Pa.

[21] Appl. No.: 254,160

[22] Filed: Mar. 31, 1981

[51] Int. Cl.³ .................................................. H02P 7/00
[52] U.S. Cl. ................................. 318/139; 318/345 R;
361/23
[58] Field of Search .................. 361/23; 318/139, 310,
318/318, 345 R, 807, 810–811; 323/276, 282;
363/124

[56] References Cited

U.S. PATENT DOCUMENTS

| | | | |
|---|---|---|---|
| 3,222,582 | 12/1965 | Heyman et al. | 318/139 |
| 3,500,161 | 3/1970 | Domann et al. | 318/308 |
| 3,546,548 | 12/1970 | Wouk | 318/376 |
| 3,764,870 | 10/1973 | Morton et al. | 318/139 |
| 3,902,105 | 10/1975 | Delaney et al. | 318/139 |
| 3,914,675 | 10/1975 | Konrad | 318/139 |
| 4,025,836 | 5/1977 | Naito et al. | 318/490 |
| 4,057,752 | 11/1977 | Artrip et al. | 318/139 |
| 4,081,725 | 3/1978 | Schmidt et al. | 318/139 |
| 4,150,324 | 4/1979 | Naito | 318/139 |
| 4,171,510 | 10/1979 | Kiwaki et al. | 318/139 |
| 4,203,047 | 5/1980 | Seki | 307/252 C |
| 4,207,503 | 6/1980 | Irschik et al. | 318/139 |
| 4,211,965 | 6/1980 | Toyama et al. | 318/341 |

Primary Examiner—G. Z. Rubinson
Assistant Examiner—Arthur G. Evans
Attorney, Agent, or Firm—Mason, Fenwick & Lawrence

[57] ABSTRACT

Apparatus is disclosed for controlling the duty ratio of the application of an energization source such as a battery to a load in the form of a motor for driving a vehicle. More particularly, there is disclosed a motor control implemented by solid state devices and more specifically, SCR elements. The apparatus employs a first oscillator circuit for providing a first train of timing pulses, the frequency of which is determined by the position of an operator manipulatable member, e.g. a vehicle accelerator pedal. The first train of pulses is applied to fire a main SCR. Further, there is provided a second oscillator circuit for providing a second train of pulses for controlling the discharging or dumping of the charge stored upon a commutating capacitor across the main SCR, thereby deactuating or commutating the main SCR. The frequency of the first oscillator is adjustable up to a value substantially that of the set frequency of the second oscillator, whereby as the frequency of the first oscillator is increased the number of times that the main SCR is turned ON is likewise increased until at full energization, the main SCR is being turned ON at a maximum rate; the time of energization i.e. the period that the main SCR is fired, is substantially constant regardless of the frequency of pulse duty ratio as established by the first oscillator circuit.

4 Claims, 1 Drawing Figure

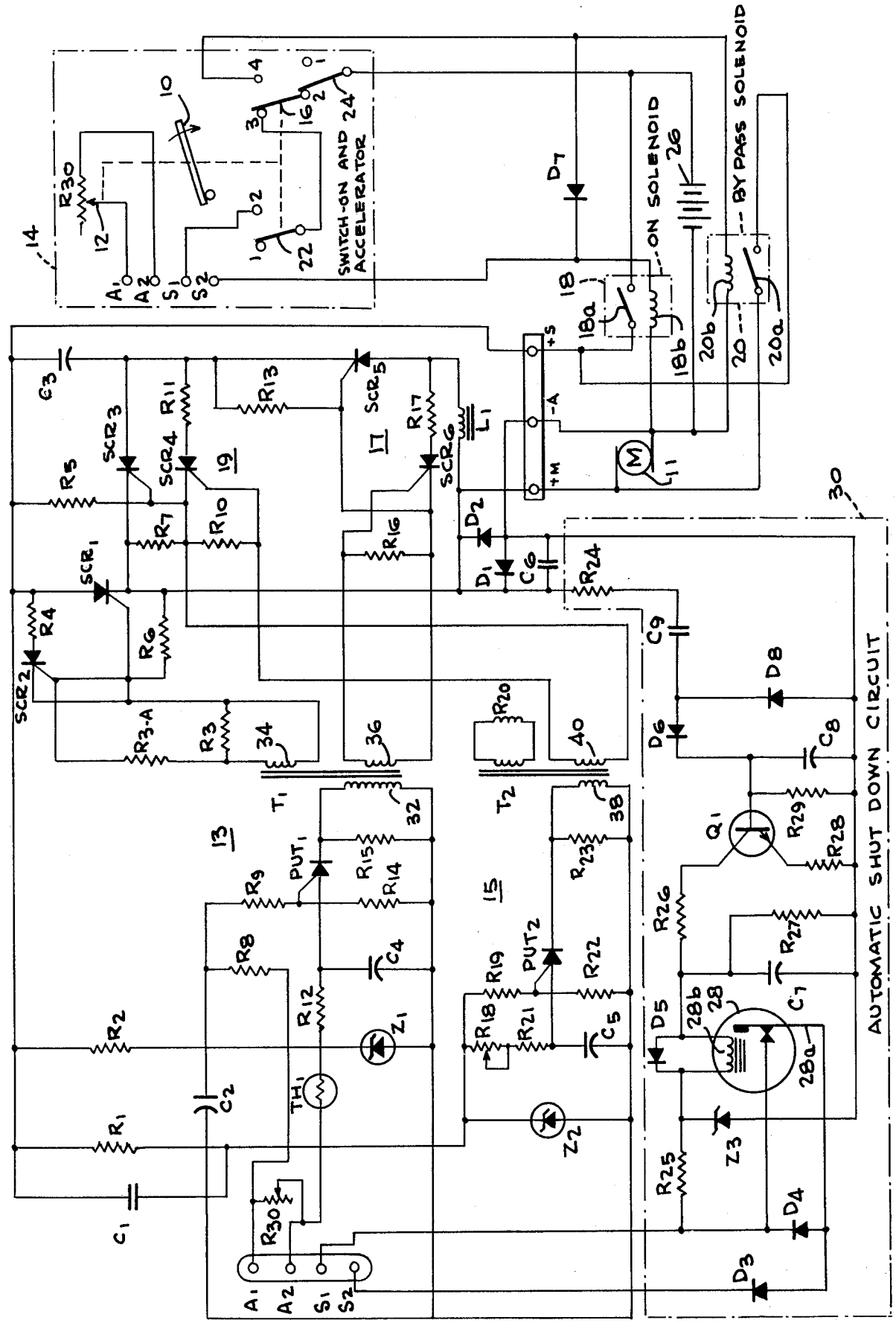

SCR MOTOR SPEED CONTROL

DESCRIPTION

Background of Prior Art

This invention relates to apparatus for controlling the application of electrical energy to a load, and more specifically to control the energization of a motor adapted to drive a vehicle.

It is well-known in the prior art to provide vehicles with on-board power sources such as batteries. More specifically, such vehicles are provided with control apparatus whereby the electrical energy supplied by the battery to the motor is controlled in terms of connecting and disconnecting (duty ratio) the battery to the motor and further, of varying the electrical power supplied by the battery to the motor, whereby motor speed and thus vehicle speed may be controlled.

Typically, such control apparatus for electrically driven vehicles has comprised a plurality of solenoids for selectively interconnecting a plurality of batteries to provide the desired degree of energization to the vehicle motor. The solenoids are connected to an accelerator switch, which is in turn configured as a vehicle or accelerator pedal. The vehicle's operator depresses the accelerator pedal to increase vehicle speed. It is readily seen that upon the coupling of a further battery that a discrete, noticeable surge in energization is supplied to the vehicle motor and an abrupt shift or jerk results due to the sudden vehicle acceleration. The solenoids are coupled to large, heavy-duty resistors and upon depression of the accelerator pedal, are actuated to insert these resistors into circuit with the battery, whereby vehicle acceleration is made more gradual. Such vehicle control tends to be most efficient at high vehicle speeds when all of the batteries are connected in series to drive the vehicle motor and the large resistors are not coupled in circuit with the battery. At less than full speed, the insertion of the resistors into circuit with the battery tends to make such vehicle control apparatus inefficient, i.e. the resistors draw relatively large currents thus dissipating the battery's current in the form of generated heat as opposed to driving the vehicle. Such vehicle control apparatus not only suffers from jerky acceleration but also decreases the time between battery recharging and eventually the life of the vehicle battery. In a situation where such vehicle control apparatus is used for golf vehicles, the increased number of battery charging reduces the availability of such vehicles for use on the golf course. In summary, it is found that the use of such resistors shortens the time period between battery recharging, reduces the availability of the vehicles for use and eventually, shortens the battery life.

The development of the silicon control rectifier (SCR) provided improved control of energy supply to loads and, in particular, control of the energization of motors and more particularly, of vehicle motors. The operation of an SCR to control the duty ratio of applying the source of energization to the load is well-known in the art. Typically, an SCR controls the duty ratio of the ON period, i.e. the time when the battery is connected to the load, to the OFF period and the increasing of the duty ratio increases the level of load energization. In a typical motor control circuit of the prior art, there is included a main SCR by which the on-board battery is selectively applied to the vehicle motor. The main SCR is turned ON or fired to apply the battery to the motor and, at a controlled time thereafter, is turned OFF or commutated typically by coupling or "dumping" a charge placed upon a commutating capacitor across the main SCR. Typically, the time of charging of the commutator capacitor as well as the time that the main SCR is rendered conductive have been increased to increase the energization of the vehicle motor. However, there is a disadvantage to such a technique in that the relatively large charges placed upon the commutating capacitor have required relatively large capacitors and in many instances have required the use of a number of capacitors connected in parallel with each other. In the particular application where it is contemplated to energize motor vehicles, it is necessary to control large currents thus requiring relatively large commutating capacitors, which are expensive. It is thus an object of this invention to reduce the capacitance and thus the number of commutating capacitors, that are required thus significantly reducing the total cost and complexity of a motor speed control.

In U.S. Pat. No. 4,084,119 of Kato et al., there is disclosed a motor control system comprising a first or ON oscillator circuit, and a second or OFF oscillator circuit for respectively turning ON and OFF a chopper circuit including a SCR-type switching element. In operation, an accelerator pedal is depressed to energize the entire circuit and to vary the period of the OFF oscillator, whereby the duty cycle of the chopper circuit is varied thus variably energizing a motor. The frequency of the OFF oscillator is controlled by a variable potentiometer which is coupled to the accelerator pedal. The Kato et al. motor control varies the OFF time of its chopper circuit to thereby control the duty cycle of energizing its motor. As a result, as the motor vehicle is accelerated and greater energization is applied to the motor, increased charge must be applied to the commutating capacitor thus requiring a commutating capacitor of larger value or a plurality of commutating capacitors.

A significant problem with the prior art is to accurately control the charging of the commutating capacitor so that it has sufficient charge to commutate the main SCR. In the prior art, as the duty ratio of applying energization to the motor increases, there has been tendency to increase the charge applied to the commutating capacitor thus requiring capacitors of greater capacitance. On the other hand, the charge placed thereon could be decreased with the result that the capacitance of the commutating capacitor could be decreased; however, there is a risk of not having sufficient charge to commutate the main SCR. The potential hazard of such a system is that the main SCR would remain full ON and apply the full voltage of the battery to the vehicle motor resulting in a possible vehicle runaway condition. Main SCR's designed to control the energization of motor vehicles draw large currents and, thus, require large charges from their commutating capacitors to be turned OFF or commutated. Thus, any solution to the problem of reducing the capacitance of the commutating capacitor, must also ensure that the main SCR adapted for vehicle motor control is commutated.

In U.S. Pat. No. 4,032,825 of Klimo, there is disclosed a motor control system having a main SCR, a commutating capacitor, a charging SCR and a commutating SCR. In operation a pulse generator provides first and second trains of output pulses whose frequency is dependent upon the resistance of a potentiometer, which is coupled to a vehicle accelerator. As the vehicle accelerator is pressed down, the frequency of the pulse generator output is increased whereby the main SCR is fired at a greater rate. Upon firing of the main SCR, the charging SCR is redered conductive to charge the capacitor. In addition, there is provided a variable time delay circuit comprised of a timing potentiometer and a timing capacitor. Upon the charging of the commutating capacitor, a voltage is supplied to charge the timing capacitor, the time of charging of which is dependent upon the setting of the timing potentiometer. Upon charging to a predetermined potential, the commutating SCR is rendered conductive thus commutating the main SCR. Thus the Klimo motor control sets the ON time of his main SCR by the timing capacitor of his delay circuit which also controls the length of the charging of the commutating capacitor. Thus, there is a capability to control the charging of the commutating capacitor but at the sacrifice of controlling the power duty ratio by which the battery is supplied to the motor.

Further, the prior art has dealt with the problem of failure of one of the principal components of SCR motor control systems, whereby the battery is fully connected to the motor thus creating a possible vehicle runaway condition. It is contemplated that the use of such controls in golf carts could impose a serious hazard to golf cart riders. U.S. Pat. No. 3,818,291 of Miyake addresses this problem, showing a detector circuit which is sensitive to the malfunctioning of a chopper circuit and in particular a main thyistor, to render a control transistor conductive whereby the thyristor is rendered non-conductive, to thereby disconnect the circuit from the battery to the motor. Further, the Miyake patent '291 shows a switch which upon full depression of an accelerator pedal, energizes a solenoid and its solenoid switch is closed whereby the full voltage of the battery is applied to its motor. It is desirable to provide a simple, less complex circuit than that employed by the Miyake patent '291 whereby a fail-safe or automatic shutdown circuit prevents the application of full voltage to the motor in the event of failure of a main component of the motor control system, e.g. the main SCR.

BRIEF SUMMARY OF INVENTION

It is therefore an object of this invention to provide a new and novel motor control that efficiently controls the application of energization to a motor, i.e. does not dissipate current through heat generating electrical resistors.

It is a more specific object of this invention to employ a new and novel motor control employing SCR's wherein the capacitance of and/or number of commutating capacitors is reduced.

It is a still further object of this invention to employ a charging circuit for the commutating capacitor of an SCR-type motor control that critically charges the commutating capacitor to a sufficient level to commutate the main SCR, while ensuring a fine control of the duty ratio of the firing and commutating of the main SCR.

In accordance with these and other objects of the invention, there is provided apparatus for controlling the duty ratio of the application of an energization source such as a battery to a load in the form of a motor for driving a vehicle. More particularly, there is disclosed a motor control implemented by solid state devices and more specifically, SCR elements. In one illustrative embodiment of this invention, there is employed a first oscillator circuit for providing a first train of timing pulses, the frequency of which is determined by the position of an operator manipulatable member, e.g. a vehicle accelerator pedal. The first train of pulses is applied to fire a main SCR. Further, there is provided a second oscillator circuit for providing a second train of pulses for controlling the discharging or dumping of the charge stored upon a commutating capacitor across the main SCR, thereby deactuating or commutating the main SCR. The frequency of the first oscillator is adjustable up to a value substantially that of the set frequency of the second oscillator, whereby as the frequency of the first oscillator is increased the number of times that the main SCR is turned ON is likewise increased until at full energization, the main SCR is being turned ON at a maximum rate; the time of energization i.e. the period that the main SCR is fired, is substantially constant regardless of the frequency of pulse duty ratio as established by the first oscillator circuit. In this fashion, the charge required to commutate the SCR is reduced and thus the capacitance of and/or the number of the commutating capacitors is reduced.

In a further aspect of this invention, there is provided a charging circuit coupled to receive the first train of pulses and including a charging SCR for charging the commutating capacitor. The charging circuit includes an inductive element establishing a resonant circuit with the commutating capacitor, whereby a relatively high voltage is supplied by the inductive element to charge the commutating capacitor.

In a still further feature of this invention, there is provided a fail-safe automatic shutdown circuit that is directly coupled to the main SCR whereby upon its failure to commutate or de-energize, a signal is generated and applied to an ON solenoid thereby opening its contact element and disconnecting the battery from the vehicle motor. In this manner upon failure for whatever reason of the main SCR full voltage will not be applied to the motor whereby a potentially runaway condition would otherwise be established.

BRIEF DESCRIPTION OF THE DRAWING

A detailed description of a preferred embodiment of this invention is made with regard to the attached drawing in which there is shown a detailed circuit diagram of the silicon control rectifier motor control of this invention.

DETAILED DESCRIPTION OF INVENTION

With regard to the drawing, there is shown an illustrative preferred embodiment of this invention for variably energizing a motor 11, whereby its speed may be efficiently varied and controlled. It is contemplated that the motor 11 is employed to drive a vehicle such as a golf cart. In such a use, the vehicle would typically have a switch-ON accelerator mechanism 14 including an accelerator pedal 10, which is manipulated by the vehicle operator's foot in a conventional manner. Initially, the operator using an appropriate key actuates an ON-OFF switch 24 of the mechanism 14 from its first to its second position, whereby the positive terminal of a battery 26 is applied via the plus A terminal, a full ON switch 16, a coupling switch 22 and terminal S1 to the control circuit. As indicated by the dotted lines in the accompanying drawing, the accelerator pedal 10 is mechanically coupled to each of the coupling switch 22 and the full-ON switch 16, as well as to an arm 12 of a potentiometer R30. The variable impedance of the potentiometer R30 is coupled via terminals A1 and A2 to the circuit as shown in the accompanying drawing. The operation of the mechanical coupling of the accelerator pedal 10 to the potentiometer arm 12 and the switches 16 and 22 will now be explained in greater detail. Upon initial depression of the accelerator pedal 10 in a downward direction as indicated by the arrow shown in the drawing, the mechanical coupling causes the coupling switch 22 to move from its first to its second position. Upon continued depression of the accelerator pedal 10, the potentiometer arm 12 is moved in a direction to cause a lower impedance to be presented by potentiometer R30 between the terminals A1 and A2. Upon full depression of the accelerator pedal 10, the full-ON switch 16 is disposed from its third position to its fourth position.

The motor speed control circuit as shown in the drawing operates, as will be explained, to control the duty ratio by which a battery 26 as coupled to the +A and −A terminals, is applied to the motor 11. The main switching element of the shown circuit is a solid state element and in particular a main SCR-1 that is selectively fired and commutated to control with an improved degree of precision, the application of electrical energy from the battery 26 to the motor 11. In particular, there is disclosed a first oscillator circuit 13 comprised primarily of a programmable unijunction transistor PUT-1 that provides a first train of pulses at a variable frequency dependent upon the position of the accelerator pedal 10 and, more specifically, upon the impedance presented by the potentiometer R30 to the first oscillator circuit 13. The plus terminal of the battery 26 is applied through the terminal +A and a closed switch 18a of an ON solenoid 18 to a positive bus of the circuit whereby the circuit as shown in the drawing is energized. The actuation of the ON solenoid 18 and, in particular, the operation of the associated automatic shutdown circuit 30 will be explained later. A reference voltage is supplied to the first oscillator circuit 13 by a divider circuit comprised of resistor R2 and a Zener diode Z1. The reference potential developed across the Zener diode Z1 is in turn applied across a voltage dividing circuit comprised of a resistor R9 and a resistor R14 connected in series with each other, the point of interconnection there between being coupled to a gate of the PUT-1. A timing circuit is formed by a resistor R8 coupled in series through the terminals A1 and A2 to the potentiometer R30, the thermistor TH-1, the resistor R12 and the capacitor C4. The point of interconnection between the capacitor C4 and the resistor R12 is connected to the base of the PUT-1. Upon charging of the capacitor C4 to a firing level through the aforedescribed timing circuit, the PUT-1 is rendered conductive thus applying a pulse to a primary winding 32 of a transformer T1. It is understood that as is well-known in the art that the frequency of the output of train pulses of the first oscillator 13 is dependent upon the aforementioned resistance and, in particular, the variable resistance as presented by the potentiometer R30. The thermistor TH-1 is temperature-responsive and as temperature increases, its resistance decreases whereby the frequency of the first oscillator circuit 13 is increased to thereby increase the level of energization and, in particular, the duty ratio of the energization applied to the motor 11.

The transformer T1 includes a first secondary coil 34 coupled via resistors R3-A and R3 to a pilot SCR-2; the output of the SCR-2 is in turn connected to the gate electrode of the main SCR-1. Upon application of a pulse to the primary coil 32, an induced, corresponding pulse is developed across the secondary coil 34 thereby firing the pilot SCR-2, which acting essentially as an amplifier, applies an amplified pulse to fire the main SCR-1. In addition, the transformer T1 includes a second secondary coil 36, whose output is coupled to a charging circuit 17 comprised of a charging SCR-5 and a pilot SCR-6. In response to an input pulse of the first train, the secondary coil 36 applies a corresponding pulse to the gate of the pilot SCR-6 firing it and thereby applying an amplified pulse to the gate of the charging SCR-5. An inductive element L1 is also included within the charging circuit 17 and upon firing of the SCR-5, is coupled with the commutating capacitor C3 whereby a resonant circuit is established quickly disposing a high voltage upon the inductive element L1 to thereby charge rapidly the commutation capacitor C3.

A second oscillator circuit 15 is also included, as shown in the enclosed drawing, essentially comprised of a PUT-2 that is energized to provide a second train of pulses of set frequency. A reference voltage is established across a Zener diode Z2 to be applied to a timing circuit comprised of a presettable potentiometer R18 connected in series with a resistor R21 and a capacitor C5. A voltage divider circuit is formed across the Zener diode Z2 comprised of a resistor R19 connected in series with resistor R22, the point of interconnection there between being connected to the gate of the PUT-2. As the capacitor C5 charges to the firing potential of the PUT-2, the PUT-2 fires applying a pulse to a primary coil 38 of a transformer T2. As seen in the drawing, the transformer T2 also includes a secondary coil 40 which is coupled to a commutating circuit 19 comprised essentially of a pilot SCR-4 and a commutating SCR-3. The secondary output at the frequency of the second oscillator 15 is applied to the gate of the pilot SCR-4, which provides an amplified output to the gate of the commutating SCR-3 firing it and applying the voltage stored upon the commutating capacitor C3 across the main SCR-1, thereby extinguishing the main SCR-1.

In operation, the operator presses down the accelerator pedal 10, closing the coupling switch 22 to its second position, whereby a voltage is applied from the +A terminal through the switches 24, 16 and 22, the terminal S1, the automatic shutdown circuit 30 and terminal S2 to energize a coil 18b of the ON solenoid 18, whereby the switch 18a is closed connecting the +A terminal to the +S terminals and thereby connecting the battery 26 between the +S and −A terminals of the circuit shown in the drawing. As the accelerator pedal 10 is continued to be pressed, the resistance presented by the potentiometer R30 is decreased, thus applying an increased current to charge the capacitor C4. As the voltage charge upon the capacitor C4 reaches the gating voltage of the PUT-1, it forward conducts thus discharging the capacitor C4 through the primary coil 32 of the transformer T1. As the capacitor C4 is successively charged and discharged, the first oscillator circuit 13 generates the first train of pulses at a frequency variably dependent on the resistance of the potentiometer R30. Thus, the secondary coil 34 of the transformer T1 applies the resulting pulses to the gate of the pilot SCR-2, which upon firing, applies a voltage to the gate of the main SCR-1. At the same time, pulses appearing on the second coil 36 are applied to render conductive the pilot SCR-6, which in turn applies a gating voltage to the charging SCR-5 which commences the charging of the commutating capacitor C3. The second oscillator circuit 15 provides the second train of pulses of a set frequency to control the discharge of the commutating capacitor C3 by firing a pilot SCR-4 which in turn fires the SCR-3 thus effecting a turn-off of the main SCR1. The frequency of the first oscillator circuit 13 is varied from a relatively low frequency up to a maximum frequency sustantially that of the second oscillator circuit 15 dependent upon the degree of depression of the accelerator 10. As the frequency of the first oscillator circuit 13 is raised, the number of the firings of the main SCR1 within a given interval is substantially increased thus applying more power to the DC motor 30. The significance of the two oscillator circuits is that the number of the firings of the SCR-1 is controlled, as opposed to the length of each firing, whereby the capacitance and/or number of the commutating capacitors C3 that is required for the circuit is significantly reduced, noting that the cost of such commutating capacitors is expensive. If a length of firing manner of control was employed, it would be necessary to use a number of the commutating capacitors C3 to handle the charge required to commute the main SCR 1 because the charge being applied by the main SCR 1 to the motor 30 is greater.

In addition to the reduced capacitance and/or number of commutating capacitors C3, the charging of the commutating capacitor is effected by a separate circuit, unrelated to the turnoff or commutating of the main SCR 1. In this manner, the commutating capacitor C3 may be critically charged to that minimal level required to commutate the main SCR-1, thus reducing its capacitance while ensuring sufficient charge to commutate or turnoff the main SCR-1. To this end, the establishment of the resonant circuit by the inclusion of the inductive element L1 is significant in that a high voltage is rapidly developed across the inductive element L1 to in turn rapidly charge the commutating capacitor C3.

The automatic shutdown circuit 30 and its associated ON solenoid 18, briefly referred to above, will be described in greater detail. It is contemplated that in one embodiment, that the SCR control circuit as shown in the enclosed drawing would be particularly adapted to energize a motor for driving a vehicle and in particular a golf cart. In such an embodiment, it is important that the failure of an element of the circuit and, in particular, the main SCR-1 would not result in the full application of the voltage developed by the battery 26 to the motor 11. In such a case, the motor 11 would be driven at full speed thus causing a possible runaway condition and injury to the cart passengers. To prevent this, the circuit and in particular the main SCR-1 is coupled to the automatic shutdown circuit 30 comprised primarily of a relay 28 having a normally open switch 28a for completing the circuit between the terminals S1 and S2. By examination of the enclosed drawings, it is seen that the closure of the terminals S1 and S2 applies an energizing voltage to the coil 18b of the ON solenoid 18, thus closing its switch 18a and applying the positive voltage of the battery 26 to the terminals +S and −A of the described circuit. In the event of failure of an element of this circuit and in particular the main SCR-1, the automatic shutdown circuit 30 de-energizes the coil 28b of the relay 28, whereby the switch 28a remains open, the energizing coil 18b de-energized and the switch 18a opened thus removing the energizing voltage from the motor 11 and preventing a possible vehicle runaway condition. As shown in the drawing, the output of the main SCR-1 is connected directly to a capacitor C9 of the automatic shutdown circuit 30. The output of the capacitor C9 is coupled to rectifying diodes D6 and D8 to apply a DC voltage to charge a capacitor C8. The point of interconnection between the capacitor C8 and the diode D6 is coupled to the base of a transistor Q1. A Zener diode Z3 limits the voltage that may be applied to an energizing coil 28b of the relay 28. A biasing resistor R26 is connected to the collector of transistor Q1, and a biasing resistor R28 is connected to the emitter of transistor Q1. Thus in normal operation with the main SCR-1 periodically conducting, the capacitor C9 passes a current to charge the capacitor C9, whereby the transistor Q1 is rendered conductive connecting resistors R26 and R28 in series with and energizing the coil 28b; the thus energized coil 28b closes the switch 28a thereby completing the circuit between the terminals S1 and S2. If for some reason, the main SCR-1 fails, typically by not cutting OFF, a constant D.C. voltage is applied through the main SCR-1 to the automatic shutdown circuit 30 that will be substantially blocked by the capacitor C9. As a result, the capacitor C8 is no longer charged, the transistor Q1 is rendered non-conductive and the switch 28a of the relay 28 is opened, whereby the circuit between S1 and S2 is interrupted thus de-energizing the ON solenoid 18 and disconnecting the battery 30 from the +S terminal. As a result, the vehicle comes to a stop. In the absence of the automatic shutdown circuit 30, a fully ON voltage is applied to the motor 11, whereby a vehicle runaway condition could be established.

Upon initial closing of the coupling switch 22 and before the main SCR-1 has commutated, it is necessary to supply a voltage to the coil 28b of the relay 28, whereby its switch 28a may be closed and the switch 18a of the ON solenoid 18 closed to apply the battery voltage to the control circuit. To this end, there is included a capacitor C7 connected across the coil 28b that is charged by a positive voltage applied through terminal S1, resistor R25 and the coil 28b, upon the initial closing of the coupling switch 22. The coil 28b continues to be energized during the charging of capacitor C7, i.e. current is being drawn through coil 28b. Once capacitor C7 has been charged, no more current is drawn through the coil 28b; however, the main SCR-1 has now began to commutate and the automatic shutdown circuit 30 has otherwise begun to energize the coil 28b. Resistor R27 is connected across the capacitor C7 to discharge capacitor C7 within a relatively short period of time, thus permitting the coupling switch 22 to be reclosed and to energize the coil 28b by drawing current therethrough to a discharged capacitor C7.

In a further feature, there is shown a bypass solenoid 20 comprising an energizing coil 20b interconnected between the fourth position or terminal of the full-ON switch 16 and the −A terminal, and a switch 20a that responds to the energization of the coil 20b to complete a circuit between the +S terminal and the motor 11. A diode D7 is connected between terminal 4 of the full-ON switch 16 and the coil 18b of the ON solenoid 18, to maintain the energization of the solenoid coil 18 while the coupling switch 22 is disposed from its first to its second position. In operation, when the pedal 10 is placed to its full position, the full-ON switch 16 is disposed to its fourth position, whereby the coil 20b is energized to close the bypass solenoid switch 20a, thus applying a voltage (if the switch 18a is closed) from the +A terminal to the +M terminal thereby bypassing the afore-described circuitry. The bypass solenoid 20 increases the efficiency of the motor speed control apparatus in that the use of the afore-described SCR circuit does impose a drain upon the battery 26 especially at maximum or nearly maximum motor energization condition. In the event that the accelerator pedal 10 is pushed to its maximum position, the afore-described motor control speed control apparatus is removed from the circuit between the battery 26 and the motor 11 and the bypass solenoid 20 provides a direct circuit connection therebetween, thus improving the efficiency of this apparatus.

Thus, there has been described a SCR motor speed control apparatus employing a main SCR to control the duty ratio by which a battery is applied to a load in the form of a motor and in particular a motor adapted to drive a vehicle, wherein the number of times that the main SCR is turned ON and OFF is controlled by the use of a first oscillator circuit whose output frequency is dependent upon the position of the vehicle accelerator pedal, and a second oscillator circuit whose output frequency is preset. As the frequency of the output of the first oscillator circuit is increased toward that of the second oscillator output, the number of times that the main SCR is turned ON and OFF is increased. In this fashion, the charge required to commutate the main SCR is reduced and, therefore, the capacitance and/or number of the apparatus' commutating capacitors is likewise reduced. Further, there is included a charging circuit whose operation is not dependent upon the required duty cycle but is operative to establish a resonant circuit whereby the commutating capacitor is rapidly charged. In a further feature, an automatic shutdown circuit is responsive to the failure of the main SCR to disconnect the battery from the motor.

In considering this invention it should be remembered that the present disclosure is illustrative only and the scope of the invention should be determined by the independent claims.

I claim:

1. Apparatus for variably controlling the application of a D.C. energization source to a motor, said apparatus comprising:
   (a) main switching means commutable between a conductive state and a nonconductive state to respectively connect and disconnect the energization source to said motor;
   (b) a solenoid having a first, normally open switch, said first switch being connected by a first circuit in series with the energization source and said main switching means, and a first coil energizable to close said first switch;
   (c) commutating means for commutating said main switch means between its conductive and nonconductive states, whereby the energization source is connected through said closed first switch to energize said motor;
   (d) a relay having a second, normally open switch, said second switch connected in series with said first switch across the energization source, and a second coil energizable to close said second switch; and
   (e) failure detector means responsive to the commutation of said main switching means for energizing said second coil, whereby said second switch is closed, said first coil energized and said first switch is closed to complete said first circuit and to energize said motor, and responsive to the lack of commutation of said main switching means for deenergizing said second coil, whereby second switch is opened, said first coil deenergized and said first switch opened to disconnect the energization source from said motor when said main switch means fails to commutate.

2. The motor controlling apparatus as claimed in claim 1, wherein said failure detector means comprises a capactive element connected to said main switching means and upon failure of said main switching means to commutate, blocking the DC energization signal applied thereto.

3. The motor controlling apparatus as claimed in claim 2, wherein said failure detector means further comprises a transistor coupled to said capactive element and responsive to the blocking of said capacitive element, for deenergizing said second coil.

4. The motor controlling apparatus as claimed in claim 2, wherein there is included a second capacitive element and a resistor connected in parallel with each other, the parallel combination of the second capacitive element and resistor being connected in series with said second coil, whereby upon the initial energization of said failure detector means, an energizing signal is directed through second coil to charge said second capacitive element.

* * * * *

UNITED STATES PATENT AND TRADEMARK OFFICE
CERTIFICATE OF CORRECTION

PATENT NO. : 4,447,767
DATED : May 8, 1984
INVENTOR(S) : Luther D. Holt

It is certified that error appears in the above-identified patent and that said Letters Patent is hereby corrected as shown below:

On the title page, "[73] Assignee: John J. Barni, Lake Harmony, Pa." should be deleted.

Signed and Sealed this

Thirteenth Day of November 1984

[SEAL]

*Attest:*

*Attesting Officer*

GERALD J. MOSSINGHOFF

*Commissioner of Patents and Trademarks*